United States Patent
Tanaka

(10) Patent No.: US 9,674,004 B2
(45) Date of Patent: Jun. 6, 2017

(54) INTERFERENCE SUPPRESSION BY USE OF DEDICATED PILOT SIGNALS

(71) Applicant: FUJITSU LIMITED, Kawasaki-shi, Kanagawa (JP)

(72) Inventor: Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 14/533,623

(22) Filed: Nov. 5, 2014

(65) Prior Publication Data
US 2015/0055612 A1 Feb. 26, 2015

Related U.S. Application Data

(63) Continuation of application No. PCT/JP2012/062235, filed on May 11, 2012.

(51) Int. Cl.
*H04L 25/02* (2006.01)
*H04L 5/00* (2006.01)
(Continued)

(52) U.S. Cl.
CPC ......... *H04L 25/0204* (2013.01); *H04B 1/126* (2013.01); *H04L 5/0035* (2013.01);
(Continued)

(58) Field of Classification Search
CPC . H04L 25/0204; H04L 5/0035; H04L 5/0051; H04L 5/0073; H04L 72/042;
(Continued)

(56) References Cited

U.S. PATENT DOCUMENTS

| 2006/0165032 A1* | 7/2006 | Hamalainen ........... H04B 7/022 370/328 |
| 2008/0008110 A1* | 1/2008 | Kishigami ............ H04W 16/28 370/310 |

(Continued)

FOREIGN PATENT DOCUMENTS

| EP | 2 704 335 A1 | 3/2014 |
| JP | 2011-509017 A | 3/2011 |

(Continued)

OTHER PUBLICATIONS

New Postcom et al., "Views on Comparation and Co-existence of FeICIC and CoMP", Agenda Item: 7.3.4, R1-120806, 3GPP TSG RAN WG1 Meeting #68, Dresden, Germany, Feb. 6-10, 2012.

(Continued)

*Primary Examiner* — Warner Wong
(74) *Attorney, Agent, or Firm* — Myers Wolin, LLC

(57) ABSTRACT

A station acquires, when one or a plurality of base stations transmit a signal addressed to a plurality of mobile stations by using the same radio resource, a first dedicated pilot signal allocated to the mobile station and a second dedicated pilot signal allocated to another mobile station. The mobile station receives a radio signal from the base station that is connected to the mobile station. By using the second dedicated pilot signal, the station estimates a channel through which the radio signal transmitted from the base station connected to the other mobile station reaches the mobile station. When the mobile station decodes a data signal addressed to the mobile station from the received radio signal by using the first dedicated pilot signal allocated to the mobile station, the mobile station suppresses an interference signal in the radio signal by using the estimate information.

5 Claims, 11 Drawing Sheets

| ALLOCATION ANTENNA PORT NUMBER (2 ports) | INTERFERENCE ANTENNA PORT NUMBER | | |
|---|---|---|---|
| | Total 2 ports (Rel.10) | Total 4 ports | Total 6 ports |
| 7, 8 | (9, 10) | 9, 10, 11, 13 | 9, 10, 11, 13, 12, 14 |
| 9, 10 | (11, 13) | 11, 13, 7, 8 | 11, 13, 12, 14, 7, 8 |
| 11, 13 | (12, 14) | 9, 10, 7, 8 | 12, 14, 7, 8, 9, 10 |
| 12, 14 | (7, 8) | − | 7, 8, 9, 10, 11, 13 |

(51) Int. Cl.
*H04W 72/04* (2009.01)
*H04B 1/12* (2006.01)

(52) U.S. Cl.
CPC .......... *H04L 5/0051* (2013.01); *H04L 5/0073* (2013.01); *H04W 72/042* (2013.01)

(58) Field of Classification Search
CPC ....... H04L 28/04; H04L 28/048; H04L 36/20; H04L 25/03006; H04L 25/03254; H04L 25/0328; H04L 4125/08; H04L 25/2691
USPC ......................................................... 370/329
See application file for complete search history.

(56) References Cited

U.S. PATENT DOCUMENTS

| | | | |
|---|---|---|---|
| 2009/0181708 | A1 | 7/2009 | Kim et al. |
| 2009/0207822 | A1 | 8/2009 | Kim et al. |
| 2009/0215480 | A1 | 8/2009 | Kim et al. |
| 2010/0099428 | A1 | 4/2010 | Bhushan et al. |
| 2010/0099449 | A1 | 4/2010 | Borran et al. |
| 2010/0114900 | A1 | 5/2010 | Anderson et al. |
| 2010/0157924 | A1* | 6/2010 | Prasad .................. H04L 1/0025 370/329 |
| 2010/0323625 | A1* | 12/2010 | Kishigami ........... H04B 7/0434 455/65 |
| 2011/0267960 | A1 | 11/2011 | Beale et al. |
| 2012/0026964 | A1 | 2/2012 | Koivisto et al. |
| 2013/0308716 | A1 | 11/2013 | Toh et al. |

FOREIGN PATENT DOCUMENTS

| | | | |
|---|---|---|---|
| JP | 2011-519538 | A | 7/2011 |
| JP | 2012-147174 | A | 8/2012 |
| WO | 2012/096116 | A1 | 7/2012 |

OTHER PUBLICATIONS

Yamada et al., "A Study on Transmit and Receive Weights in Base Station Cooperation MIMO with Interference Alignment", IEICE Technical Report, pp. 191-196, RCS2009-291, The Institute of Electronics, Information and Communication Engineers (IEICE), Mar. 2010, with an English abstract.

Notice of Rejection issued for corresponding Japanese Patent Application No. 2014-514343 mailed Aug. 18, 2015 with an English translation.

Extended European search report with supplementary European search report and the European search opinion issued by the European Patent Office for corresponding European Patent Application No. 12876226.7, mailed on Apr. 23, 2015.

Tomoyuki Yamada et al., "Enhanced Simplified Maximum Likelihood Detection (ES-MLD) in multi-user MIMO downlink in time-variant environment", NTT Network Innovation Laboratories, Mar. 7, 2007, XP855158681.

3GPP TS 36.211 V10.4.0; 3rd Generation Partnership Project-;Technical Specification Group Radio Access Network; Evolved Universal Terrestrial Radio Access (E-UTRA);Physical Channels and Modulation (Release 10) Dec. 2011.

3GPP TS 36.212 V10.5.0; 3rd Generation Partnership Project; Technical Specification Group Radio Access Network; Evolved Universal Terrestrial Radio Access (E-UTRA); Multiplexing and channel coding (Release 10); Mar. 2012.

3GPP TS36.213 V10.5.0; 3rd Generation Partnership Project; Technical Specification Group Radio Access Network; Evolved Universal Terrestrial Radio Access (E-UTRA); Physical layer procedures (Release 10); Mar. 2012.

3GPP TS36.214 V10.1.0; 3rd Generation Partnership Project; Technical Specification Group Radio Access Network; Evolved Universal Terrestrial Radio Access (E-UTRA); Physical layer; Measurements (Release 10); Mar. 2011.

3GPP TR36.814 V9.0.0; 3rd Generation Partnership Project; Technical Specification Group Radio Access Network; Evolved Universal Terrestrial Radio Access (E-UTRA); Further advancements for E-UTRA physical layer aspects (Release 9); Mar. 2010.

Tomoyuki Yamada et al-"Expanded simplified maximum likelihood detection (ES-MLD) in multiuser MIMO downlink with inter-user-interference" The Institute of Electronics, Information and Communication Engineers, Mar. 7, 2007 Cited in ISR, with partial English translation.

Ericsson et al., "Discussions on DL CoMP Schemes", Agenda Item 7.5.1, 3GPP TSG-RAN WG1 #66bis, R1-113353, Zhuhai, China, Oct. 10-14, 2011,Cited in ISR.

Kazuki Maruta et al. , "Spectral Efficiency Improvement with Inter-Cluster Interference Canceling for Multiuser-MIMO Distributed Antenna Systems", The Institute of Electronics, Information and Communication Engineers, Jan. 14, 2010, Cited in ISR, with partial English translation.

International Search Report issued for corresponding International Patent Application No. PCT/JP2012/062235, mailed Aug. 14, 2012 with an English translation.

First Notification of Office Action issued by the State Intellectual Property Office of China for corresponding Chinese Patent Application No. 201280073055.4, dated Dec. 19, 2016, with an English translation.

\* cited by examiner

FIG.4

| ALLOCATION ANTENNA PORT NUMBER (2 ports) | INTERFERENCE ANTENNA PORT NUMBER | | |
|---|---|---|---|
| | Total 2 ports (Rel.10) | Total 4 ports | Total 6 ports |
| 7, 8 | (9, 10) | 9, 10, 11, 13 | 9, 10, 11, 13, 12, 14 |
| 9, 10 | (11, 13) | 11, 13, 7, 8 | 11, 13, 12, 14, 7, 8 |
| 11, 13 | (12, 14) | 9, 10, 7, 8 | 12, 14, 7, 8, 9, 10 |
| 12, 14 | (7, 8) | – | 7, 8, 9, 10, 11, 13 |

FIG.5

| ALLOCATION ANTENNA PORT NUMBER (4 ports) | INTERFERENCE ANTENNA PORT NUMBER (Total 4 ports) |
|---|---|
| 7, 8, 11, 13 | 9, 10, 12, 14 |
| 9, 10, 12, 14 | 7, 8, 11, 13 |

INTERFERENCE SUPPRESSION BY USE OF DEDICATED PILOT SIGNALS

CROSS-REFERENCE TO RELATED APPLICATION

This application is a continuation application of International Application PCT/JP2012/062235, filed on May 11, 2012, and designating the U.S., the entire contents of which are incorporated herein by reference.

FIELD

The embodiments discussed herein are directed to a mobile station and a wireless communication method.

BACKGROUND

In recent years, in wireless communication systems, such as mobile phone systems or the like, in order to implement high-speed and high-capacity wireless communication, the next-generation wireless communication technology is being discussed. For example, at the 3rd Generation Partnership Project (3GPP) that is a standards organization, the communication standard named Long Term Evolution (LTE) and the communication standard named LTE-A (LTE-Advanced) based on the LTE wireless communication technology are standardized.

In LTE-A, as one of the technologies of increasing the capacity of systems, Multi-user Multiple Input Multiple Output (MU-MIMO) is supported, in which a plurality of user signals are transmitted through the same radio resource by using a spatial multiplexing technique.

Furthermore, in LTE Release 8, transmission to each mobile terminal device (User Equipment: UE) is limited to the number of ranks of 1 and the precoding weight is selected from a code book that is previously defined. For example, by using a downlink control channel, a wireless base station (evolutional Node B: eNB) notifies the UE of the Precoding Matrix Index (PMI) that is the information on the selected precoding weight. By using the notified PMI information and Cell-specific Reference Signals (CRS), the UE demodulates a data signal (physical downlink shared channel: PDSCH) addressed to the UE.

Furthermore, in LTE Release 9, the number of ranks per UE is increased to 2 and dedicated pilot signals (DM-RS) with a maximum of 2 layers can be inserted. Furthermore, with LTE in Release 10, DM-RSs with a maximum of 8 layers can be inserted. With LTE in Release 9 and the subsequent release, because DM-RS subjected to the same precoding as that performed on a data channel is used, there is no constraint to select a precoding weight from a code book.

Consequently, an eNB can use arbitrary precoding; does not need to notify each UE of the PMI and send, as a notification, an antenna port number of the DM-RS that is allocated to the own eNB. UE modulates the PDSCH by using the notified DM-RS. Furthermore, with LTE in Release 10, as a downlink DM-RS, 8 antenna ports are defined and spatial multiplexing transmission of a signal with a maximum of 8 layers is supported.

Furthermore, with LTE-A, in order to reduce interference between cells and in order to improve received signal intensity, the introduction of a Coordinated MultiPoint (CoMP) communication technology is being studied. With CoMP communication technology, multiple communication points that are geographically separated each other perform communication in cooperation with each other. Each of the communication points is constituted by, for example, a base station, a femto base station, a remote antenna, or the like. By using these multiple communication points, transmission is adjusted between multiple points.

For example, for downlink CoMP, Joint Transmission (JT), Dynamic Point Selection (DPS), and Coordinated Scheduling/Coordinated Beamforming (CS/CB) are being studied. The JT is a method of simultaneously transmitting the same data from multiple communication points to a wireless terminal. The DPS is a method of dynamically selecting a point, from among the multiple communication points, from which data is actually transmitted. The CS/CB is a method of performing precoding control in coordination between multiple points.

In the JT or the DPS, multiple coordinated communication points transmit a data signal to the same UE. In the CS/CB, each coordinated cell transmits data to UE in its own cell. Furthermore, for uplink CoMP, a method (Joint Reception: JR) of joining signals received at multiple points while communication is being performed between points and a method, such as DPS, is being studied.

Non Patent Literature 1: 3GPP TS36.211 V10.4.0 (2011-12)
Non Patent Literature 2: 3GPP TS36.212 V10.5.0 (2012-3)
Non Patent Literature 3: 3GPP TS36.213 V10.5.0 (2012-3)
Non Patent Literature 4: 3GPP TS36.214 V10.1.0 (2011-3)
Non Patent Literature 5: 3GPP TR36.814 V9.0.0 (2010-03)

However, in the conventional technology, because suppression of interfere is not sufficiently performed, there is a problem in that the communication quality is degraded.

For example, in LTE Release 9 and beyond, downlink MU-MIMO transmission using DM-RS is standardized. In Release 11, standardization of downlink CoMP transmission has been developed. In the downlink MU-MIMO transmission, signals addressed to a plurality of UEs are multiplexed into the same radio resource. Furthermore, in the downlink CoMP transmission in the CS/CB, data transmission to UE in its own cell is performed between coordinated cells by using the same radio resource.

In both methods, an eNB selects a combination of UEs, in which PMIes that are fed back from UEs and that are orthogonal to each other, or adjusts precoding. However, as described above, with a measure against interference at the time of transmission, it is difficult to sufficiently remove an interference signal from a received signal and thus, the communication quality of the signals that are decoded by each UE and that are addressed to its own device is low.

SUMMARY

According to an aspect of the embodiments, a mobile station includes an acquiring unit that acquires, when one or a plurality of base stations transmit a signal addressed to a plurality of mobile stations by using the same radio resource, a first dedicated pilot signal allocated to the mobile station and a second dedicated pilot signal that is allocated to another mobile station; a receiving unit that receives a radio signal from the base station that is connected to the mobile station; an estimating unit that estimates, by using the second dedicated pilot signal that is allocated to another mobile station and that is acquired by the acquiring unit, a channel through which a radio signal that is transmitted from the base station connected to the other mobile station to the other mobile station reaches the mobile station; and a decoding unit that suppresses, when decoding a data signal addressed to the mobile station from the received radio signal by using the first dedicated pilot signal allocated to the mobile station, an interference signal in the radio signal by using information of the channel estimated by the estimating unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a schematic diagram illustrating a first example of an association table.

FIG. 5 is a schematic diagram illustrating a second example of the association table.

DESCRIPTION OF EMBODIMENTS

Preferred embodiments of mobile station and a wireless communication method according to the present invention will be described in detail below with reference to the accompanying drawings. The present invention is not limited to the embodiments.

First Embodiment

[Overall Configuration]

Figure 1:
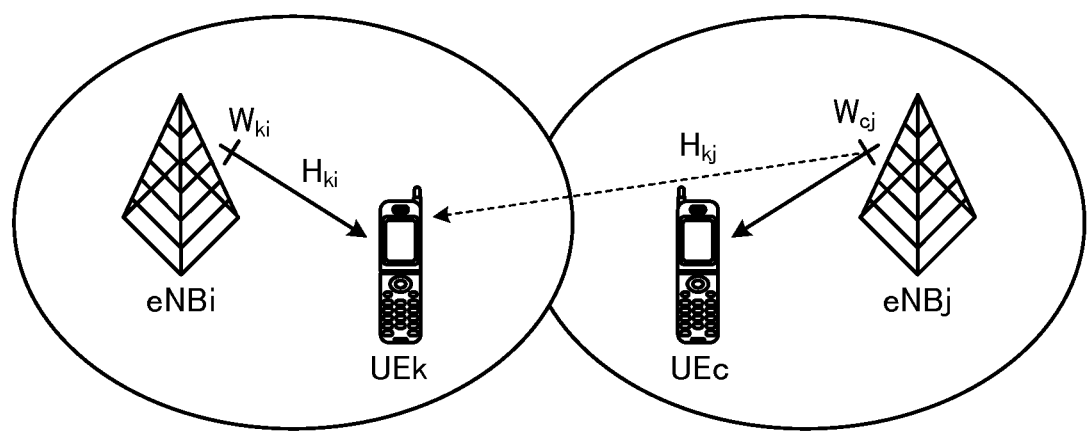
FIG. 1 is a schematic diagram illustrating an example of the overall configuration of a wireless communication system according to a first embodiment.

FIG. 1 is a schematic diagram illustrating an example of the overall configuration of a wireless communication system according to a first embodiment. The wireless communication system illustrated in FIG. 1 is a system in which a base station (eNBi) is adjacent to a base station (eNBj) and that performs coordinated multipoint (CoMP) communication. In the wireless communication system, a base station and a mobile station performs wireless communication conforming to LTE. In this example, it is assumed of a case in which, each base station sends a data signal to a mobile station in each cell by using the same radio resource. Namely, downlink coordinated multipoint communication will be described as an example. An example of a mobile station includes a mobile phone or a smart phone.

The eNBi transmits, by using a radio resource A, a data signal to a mobile station (UEk), such as a mobile phone or the like. The UEk connects to a cell i in which a radio wave output from the eNBi reaches and receives the data signal from the eNBi.

The eNBj transmits, by using the same radio resource A as that used by the eNBi, a data signal to a mobile station (UEc), such as a mobile phone. The UEc connects to the cell j to which the radio wave output from the eNBj reaches and receives the data signal from the eNBj.

In such a case, because, in addition to the data signal received from the eNBi, the UEk also receives the signal output from the eNBj, the quality of the data signal sent to the own station, i.e., the UEk, is low. Accordingly, if the UEk is able to specify a dedicated pilot signal that is allocated to the UEc, the UEk can estimate equivalent channel information on an interference signal.

In a description below, a precoding vector used for a transmission signal addressed to the UEk in the cell i is represented by "$W_{ki}$" and the channel matrix between the cell j and the UEk is represented by "$H_{kj}$". In this case, if the UEk can specify a dedicated pilot signal allocated to the UEc, the UEk can estimate equivalent channel information "$H^{(k)}_{ij}=H_{kj} \times W_{cj}$" on the interference signal that is output from the UEc that performs communication in the cell j by using the same radio resource. If so, by using the equivalent channel information "$H^{(k)}_{ii}=H_{ki} \times W_{ki}$" on the signal addressed to the UEk and the equivalent channel information "$H^{(k)}_{ij}=H_{kj} \times W_{cj}$" on the interference signal, the UEk can suppress the interference signal when the UEk decodes the data signal.

Specifically, the UEk stores therein the association relationship of dedicated pilot signals that are allocated by the eNBi and the eNBj to each of the mobile stations. Then, the UEk acquires the dedicated pilot signal that is allocated to another mobile station and that is associated with the dedicated pilot signal that is allocated to the UEk. Then, by using the dedicated pilot signal allocated to the other mobile station, the UEk estimates a channel through which a radio signal that is addressed to the UEc from the eNBj that is connected to the UEc reaches the UEk. When the UEk decodes the signal addressed to the UEk from the received data signal by using the dedicated pilot signal allocated to the UEk, the UEk suppresses an interference signal from the data signal by using the estimated estimate value.

Consequently, when the UEk decodes the data signal that is received from the eNBi, the UEk can suppress the interference signal that interferes with the data signal and that is received from the eNBj. Accordingly, the UEk can suppress degradation of the communication quality of the data signal that is received from the eNBi.

[Configuration of the Base Station]

Figure 2:
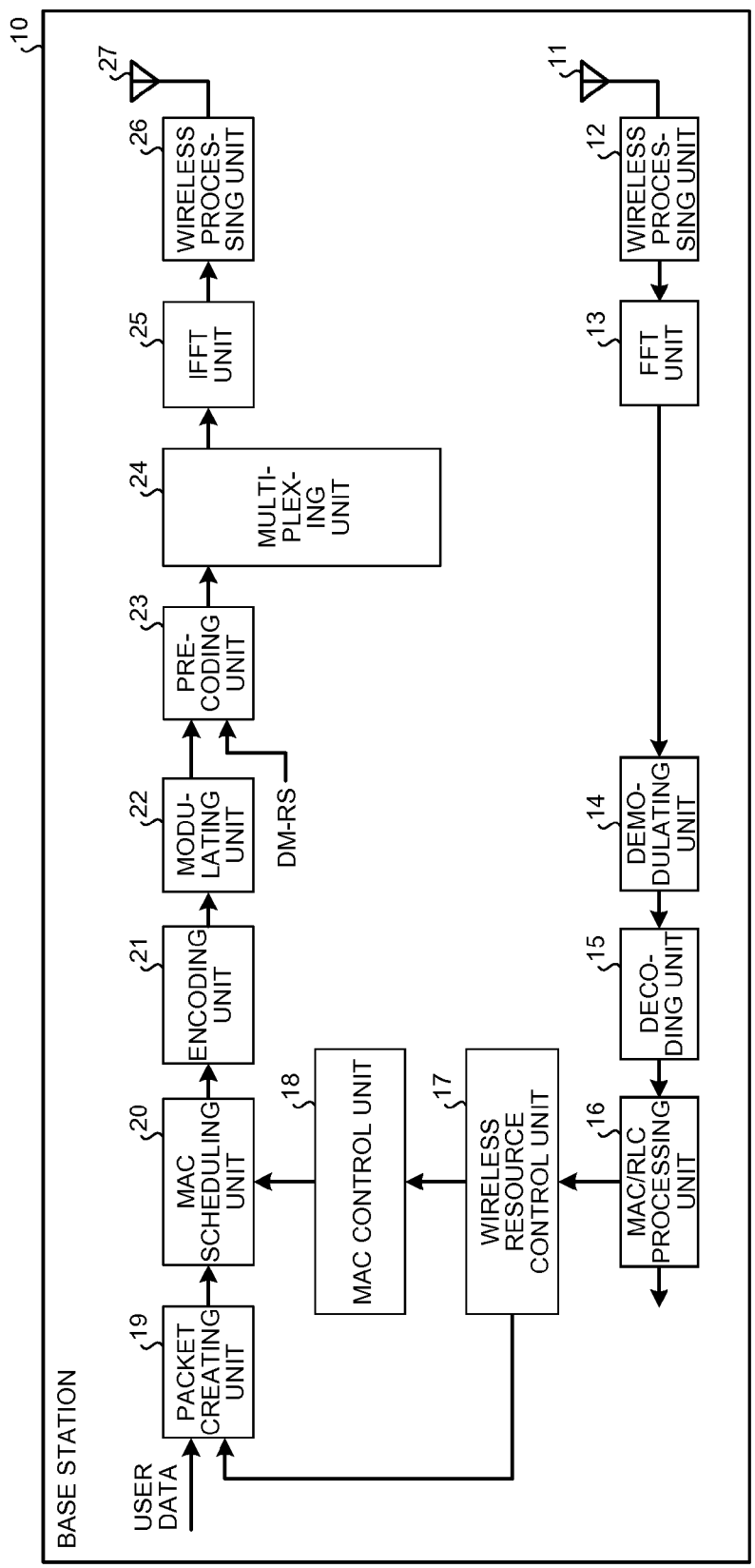
FIG. 2 is a functional block diagram illustrating the functional configuration of a base station.

In the following, a description of the functional configuration of the base stations illustrated in FIG. 1 will be described. Because the eNBi and the eNBj illustrated in FIG. 1 have the same configuration, a description thereof will be given by using a base station 10. FIG. 2 is a functional block diagram illustrating the functional configuration of a base station.

As illustrated in FIG. 2, the base station 10 includes a receiving antenna 11, a wireless processing unit 12, a fast Fourier transformation (FFT) unit 13, a demodulating unit 14, a decoding unit 15, a medium access control/radio link control (MAC/RLC) processing unit 16, and a wireless resource control unit 17. Furthermore, the base station 10 includes a MAC control unit 18, a packet creating unit 19, a MAC scheduling unit 20, an encoding unit 21, a modulating unit 22, a precoding unit 23, a multiplexing unit 24, an IFFT unit 25, a wireless processing unit 26, and a transmitting antenna 27. The processing units described here are only examples. The base station 10 may also include a processing unit other than the processing units illustrated in the drawing.

The receiving antenna 11 receives a radio signal and outputs the received radio signal to the wireless processing unit 12. Specifically, the receiving antenna 11 receives an orthogonal frequency division multiplexing (OFDM) signal transmitted from the UE that is located in a cell. For example, the receiving antenna 11 receives an uplink signal via an uplink data channel or a control channel. The channel that receives a signal includes a physical random access channel (PRACH), a physical uplink shared channel (PUSCH), and a physical uplink control channel (PUCCH). The uplink signal includes a reference signal (RS), a control signal, and a data signal.

The base station 10 may also include a plurality of receiving antennas. Furthermore, the receiving antenna 11 and the transmitting antenna 27 may also be configured as a transmitting/receiving antenna in which the transmitting and the receiving of a radio signal are switched.

The wireless processing unit 12 is a processing unit that performs a receiving process, such as down-conversion, A/D (analog/digital) conversion, quadrature demodulation, or the like, on the received signal that is input from the receiving antenna 11. For example, the wireless processing unit 12 converts the received signal that is an analog signal to a digital signal and then outputs the converted signal to the FFT unit 13.

The FFT unit 13 is a processing unit that performs an FFT process on the signal that is input from the wireless processing unit 12. For example, the FFT unit 13 performs the FFT process on the digital signal that has been subjected to a wireless receiving process, converts the signal to a frequency domain signal, and outputs the converted signal to the demodulating unit 14.

The demodulating unit 14 is a processing unit that performs, on the basis of control information that is previously notified or stored or on the basis of a reference signal for demodulation, a demodulation process on the signal that has been subjected to the FFT process. For example, by using the reference signal transmitted from the UEk, the demodulating unit 14 performs channel estimation between the UEk and the base station 10. Then, the demodulating unit 14 performs channel compensation on the signal that is input from the FFT unit 13 by using a channel estimate value and demodulates the signal that has been subjected to the FFT process.

The decoding unit 15 is a processing unit that decodes, on the basis of the control information that is previously notified or stored or on the basis of a channel estimate value estimated from the reference signal, the signal subjected to the demodulation process. Then, the decoding unit 15 outputs the decoded signal to the MAC/RLC processing unit 16. The decoding process is performed by using, for example, the channel estimate value of a PUSCH that is estimated by using the reference signal.

The MAC/RLC processing unit 16 is a processing unit that performs a reordering process or the like on the signal subjected to the decoding process by the decoding unit 15 and that acquires reception data. The reception data is stored in, for example, a reception buffer (not illustrated) and is processed by an application or the like. Furthermore, the MAC/RLC processing unit 16 outputs reception quality, control information, or the like acquired from the received signal. Furthermore, the MAC/RLC processing unit 16 outputs, as the result of the decoding of a data signal, acknowledgement (ACK) or negative acknowledgement (NACK) to the wireless resource control unit 17. Furthermore, the MAC/RLC processing unit 16 outputs, as the result of the decoding of the data signal, PMI information, a rank indicator (RI), and a channel quality indicator (CQI) to the wireless resource control unit 17.

The wireless resource control unit 17 is a processing unit that selects UE used for CoMP on the basis of the result of coordination between CoMP coordinated cells. For example, the wireless resource control unit 17 selects UE on the basis of the information input from the MAC/RLC processing unit 16, i.e., on the basis of the PMI information, RI, CQI, or the like that is fed back from the UE.

For example, the wireless resource control unit 17 holds an association table of antenna ports that are used between base stations in a coordinated manner in CoMP. An example of the association table of antenna ports will be described later. Then, the wireless resource control unit 17 receives, from the other base station, an antenna port number that is used by the other base station that is in coordination in CoMP. Then, the wireless resource control unit 17 specifies an antenna port number that is associated with the received antenna port number that is used by the other base station from the held association table and then outputs the associated antenna port number to the MAC control unit 18. If the UE does not hold the association table, the wireless resource control unit 17 outputs the association table to the packet creating unit 19 in order to transmit the association table to the UE. Then, the association table is transmitted from the base station 10 to the UE.

The MAC control unit 18 is a processing unit that allocates an antenna port number to each UE. For example, the MAC control unit 18 allocates the antenna port number notified by the wireless resource control unit 17 to UE. Then, the MAC control unit 18 sends a notification of the allocated antenna port number by using the PDCCH when data transmission or the like is performed. Furthermore, the MAC control unit 18 notifies the MAC scheduling unit 20 of the control information that is used for MAC scheduling. Furthermore, the MAC control unit 18 outputs, to a multiplexing unit 29, the control signal that is transmitted via the PDCCH.

The packet creating unit 19 is a processing unit that creates a packet that includes therein user data or an association table. The user data is acquired from, for example, a higher-level device or another base station and is stored in a transmission buffer that is not illustrated. Furthermore, the packet created by the packet creating unit 19 is read from the transmission buffer or the like by the MAC scheduling unit 20.

The MAC scheduling unit 20 is a processing unit that allocates the packet created by the packet creating unit 19 to a transport block. The MAC scheduling unit 20 outputs the transmission data that has been allocated to the transport block to the encoding unit 21.

The encoding unit 21 is a processing unit that encodes, on the basis of the control information, the transmission data that is input from the MAC scheduling unit 20. The encoding unit 21 outputs the encoded data to the modulating unit 22.

The modulating unit 22 is a processing unit that modulates, on the basis of the control information, the encoded data that is input from the encoding unit 21. For example, the modulating unit 22 modulates the encoded data by using a modulation technique, such as 64 quadrature amplitude modulation (QAM), quadrature phase shift keying (QPSK), or the like, and outputs the modulated data to the precoding unit 23.

The precoding unit 23 is a processing unit that performs, for each UE, precoding on the data addressed to each UE and the attached antenna port number. For example, the precoding unit 23 performs, for each UE, the weighting on transmission data from each UE and then outputs the data to the multiplexing unit 24.

The multiplexing unit 24 is a processing unit that allocates modulated transmission data, a reference signal that is commonly used in a cell, a separate, i.e., dedicated control signal (PDCCH), or the like to a radio resource. For example, by mapping transmission data, a cell common reference signal, and a separate control signal to the frequency axis, the multiplexing unit 24 performs frequency multiplexing and then outputs the data or the signal to the IFFT unit 25. Namely, the multiplexing unit 24 performs digital modulation by using OFDM.

Here, in the first embodiment in which CoMP communication is performed, it is assumed that the radio resource that is allocated, by the multiplexing unit 24 in the eNBi, to the transmission data addressed to the UEk and the radio resource that is allocated, by the multiplexing unit 24 in the eNBj, to the transmission data addressed to the UEc are the same.

The IFFT unit 25 is a processing unit that performs an IFFT process on the signal that is input from the multiplexing unit 24. Namely, the IFFT unit 25 converts a multiplexed signal to a time domain signal, i.e., an OFDM signal, and then outputs the converted signal to the wireless processing unit 26.

The wireless processing unit 26 is a processing unit that performs D/A conversion, a distortion compensation process, an amplification process, up-conversion, quadrature modulation, or the like on the signal subjected to the IFFT process and then outputs the signal to the transmitting antenna 27.

The transmitting antenna 27 transmits a transmission signal that is input from the wireless processing unit 26. The base station 10 may also include a plurality of transmitting antennas. The transmitting antenna 27 transmits a downlink signal via, for example, a downlink data channel or a control channel. The channel that is used to transmit a signal includes a primary search channel (PSCH), a physical broadcast channel (PBCH), a physical downlink shared channel (PDSCH), and a physical downlink control channel (PDCCH). The downlink signal includes a reference signal RS, a control signal, and a data signal.

[Configuration of the Mobile Station]

Figure 3:
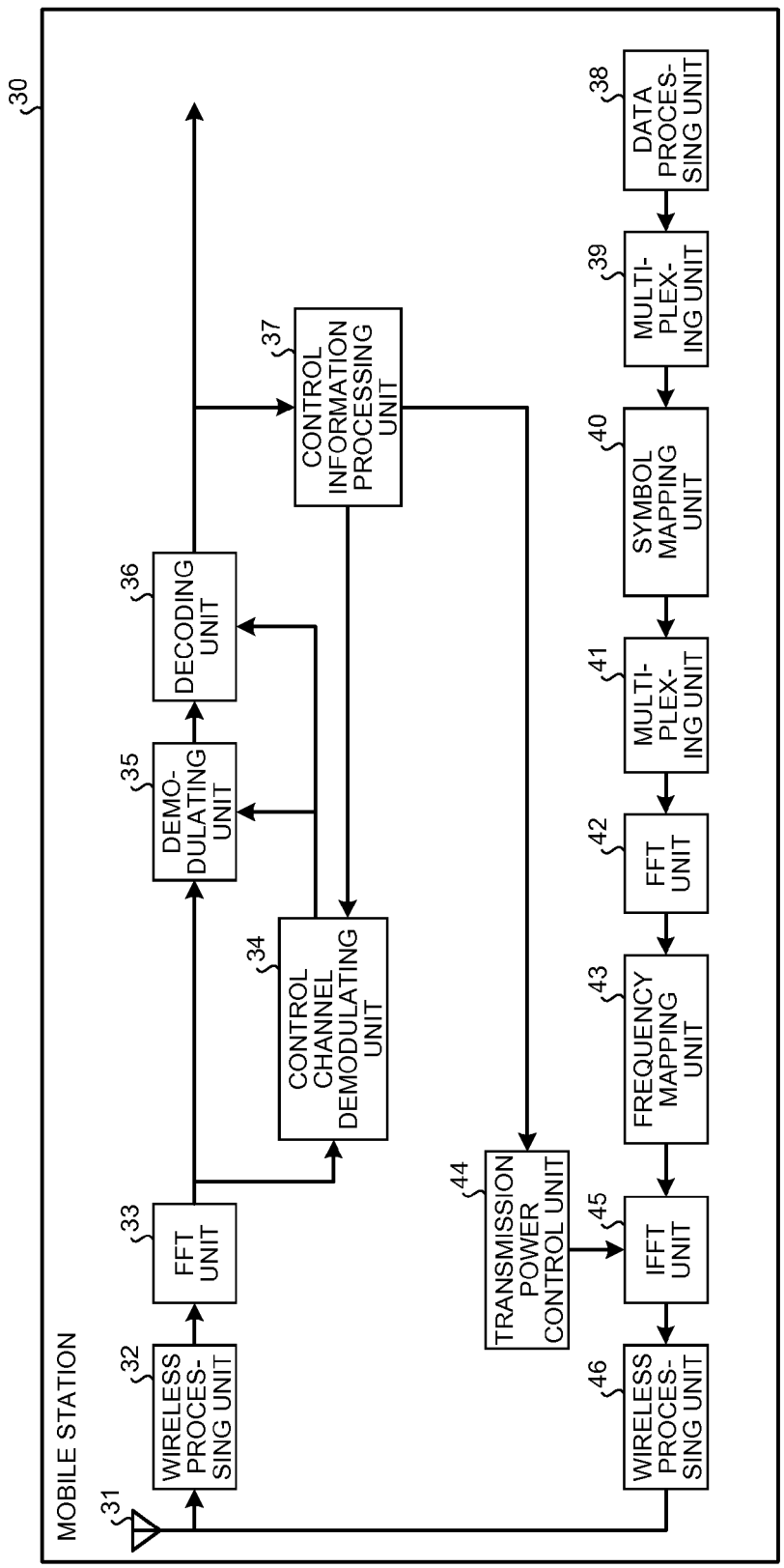
FIG. 3 is a functional block diagram illustrating the functional configuration of a mobile station.

In the following, the functional configuration of the mobile stations illustrated in FIG. 1 will be described. Because the UEk and the UEc illustrated in FIG. 1 have the same configuration, a description thereof will be given by using a mobile station 30. FIG. 3 is a functional block diagram illustrating the functional configuration of a mobile station.

As illustrated in FIG. 3, the mobile station 30 includes an antenna 31, a wireless processing unit 32, an FFT unit 33, a control channel demodulating unit 34, a demodulating unit 35, a decoding unit 36, and a control information processing unit 37. Furthermore, the mobile station 30 includes a data processing unit 38, a multiplexing unit 39, a symbol mapping unit 40, a multiplexing unit 41, an FFT unit 42, a frequency mapping unit 43, a transmission power control unit 44, an IFFT unit 45, and a wireless processing unit 46. The processing units described here are only examples. The mobile station 30 may also include a processing unit other than the processing units illustrated in the drawing.

The antenna 31 can be switched between the transmitting and the receiving and performs the transmitting and receiving of a radio signal. When the transmission is performed, the antenna 31 transmits the OFDM signal that is output from the wireless processing unit 46. When the receiving is performed, the antenna 31 outputs the received OFDM signal to the wireless processing unit 32. The antenna may also be different antennas: one is used to transmit a signal and the other one is used to receive a signal. Furthermore, a plurality of antennas may also be used.

The wireless processing unit 32 is a processing unit that performs a receiving process, such as down-conversion, quadrature demodulation, A/D conversion, or the like, on the received downlink radio signal. For example, the wireless processing unit 32 converts the received signal that is an analog signal to a digital signal and then outputs the converted signal to the FFT unit 33.

The FFT unit 33 is a processing unit that performs the FFT process on the signal that is input from the wireless processing unit 32. For example, the FFT unit 33 performs the FFT process on the received OFDM signal obtained from the digital signal that has been subjected to the wireless receiving process; acquires a subcarrier signal from the OFDM signal; and outputs the signal to the control channel demodulating unit 34 and the demodulating unit 35.

The control channel demodulating unit 34 is a processing unit that demodulates control channel information on the basis of control information, such as Radio Network Temporary Identity (RNTI), notified from the control information processing unit 37. For example, the control channel demodulating unit 34 outputs, to the demodulating unit 35 as the result of the demodulation, an antenna port that was used by the base station 10 for transmission data addressed to its own mobile station. Furthermore, the control channel demodulating unit 34 outputs, to the decoding unit 36 as the result of the demodulation, allocation information on the radio resource used by the base station 10 for transmission data addressed to its own mobile station.

The demodulating unit 35 is a processing unit that demodulates a data signal by using the control information that was notified via a separate a separate, i.e., dedicated control channel. Specifically, when each of the eNBi and the eNBj, which are adjacent each other, transmits a signal addressed to a mobile station by using the same radio resource, the demodulating unit 35 holds the association relationship of the antenna port that is allocated to the mobile station by each eNB. Then, the demodulating unit 35 acquires, from the control channel demodulating unit 34, an antenna port number that was used for the data signal addressed to its own mobile station. Then, the demodulating unit 35 specifies, from the association table, an antenna port number that is associated with the antenna port number of its own mobile station and that is used for a data signal addressed to another mobile station.

Subsequently, the demodulating unit 35 specifies the location of a dedicated pilot signal by using the antenna port number of the other mobile station and estimates a channel for the other mobile station. Then, the demodulating unit 35 specifies the location of a dedicated pilot signal by using the antenna port number of its own mobile station and suppresses, when the demodulating unit 35 demodulates the data signal addressed to its own mobile station from the received signal, an interference signal that is included in the received signal by using the estimated channel estimate value of the other mobile station. Namely, the demodulating unit 35 demodulates the data signal addressed to its own mobile station by increasing the weight of the data signal addressed to its own mobile station included in the received signal and by decreasing the weight of the interference signal addressed to the other mobile station included in the received signal. Furthermore, by using the antenna port number, the demodulating unit 35 can specify the location of a dedicated pilot signal from the mapping of downlink dedicated pilot signals stated in LTE release 10.

FIG. 4 is a schematic diagram illustrating a first example of an association table. As illustrated in FIG. 4, the association table is information in which "an allocation antenna port number and an interference antenna port number (total 2 ports, total 4 ports, and total 6 ports)" are associated. The "allocation antenna port number" indicates an antenna port number that is allocated to its own mobile station. The "interference antenna port number (total 2 ports)" indicates that, when the total number of the antenna ports used by a base station in cooperation is 2, the antenna port numbers to be used. The "interference antenna port number (total 4 ports)" indicates that, when the total number of the antenna ports used by a base station in cooperation is 4, the antenna port numbers to be used. The "interference antenna port number (total 6 ports)" indicates that, when the total number of the antenna ports used by a base station in cooperation is 6, the antenna port numbers to be used.

The case illustrated in FIG. 4 indicates that, if the port numbers allocated to its own mobile station are No. 7 and 8, when the base station that cooperates with the mobile station uses 2 ports, the antenna port numbers of the base station are No. 9 and 10. Furthermore, FIG. 4 indicates that, if the port numbers allocated to its own mobile station are No. 7 and 8, when the base station that cooperates with the mobile station uses 4 ports, the antenna port numbers of the base station are No. 9, 10, 11, and 13. Furthermore, FIG. 4 indicates that, if the port numbers allocated to its own mobile station are No. 7 and 8, when the base station that cooperates with the mobile station uses 6 ports, the antenna port numbers of the base station are No. 9, 10, 11, 12, 13, and 14.

Furthermore, this association relationship is previously defined between the base station and the mobile station. The total number of the antenna ports used by a base station that cooperates with a mobile station is sent, as a notification, from the base station to the mobile station by using Radio Resource Control (RRC) signaling or the like. Furthermore, FIG. 4 illustrates an example in which two antenna ports are allocated to its own mobile station; however, the number thereof is not limited thereto. For example, as illustrated in FIG. 5, the demodulating unit 35 may also hold the similar association relationship when four antenna ports are allocated to its own mobile station.

FIG. 5 is a schematic diagram illustrating a second example of the association table. As illustrated in FIG. 5, if the port numbers allocated to its own mobile station are No. 7, 8, 11, and 13, when the base station that cooperates with the mobile station uses 4 ports, the antenna port numbers of the base station are No. 9, 10, 12, and 14. Furthermore, the setting of the combinations of the antenna ports illustrated in FIGS. 4 and 5 may also be arbitrarily changed. However, the combinations of the antenna ports are preferably combinations of port numbers in which the locations of the dedicated pilot signals mapped when spatial multiplexing is performed are the same. By doing so, it is possible to transmit more data.

In the following, suppression of an interference signal will be described with reference to FIG. 1. The UEk calculates the weighting factor "$w_k$" of a received signal addressed to its own mobile station by using a minimum mean squared error (MMSE) method. For example, the UEk specifies an antenna port number that is allocated to the UEc from the association table and then can specify the location of the dedicated pilot signal of the UEc. Consequently, the UEk can estimate the equivalent channel information "$H^{(k)}_{ij}=H_{kj} \times W_{cj}$" on the interference signal output from the UEc that performs communication in the cell j by using the same radio resource. Furthermore, The UEk specifies the location of the dedicated pilot signal from the antenna port number that is used by its own mobile station and then can specify the equivalent channel antenna port number information "$H^{(k)}_{ii}=H_{ki} \times W_{ki}$" on the signal addressed to its own mobile station.

Then, by substituting the equivalent channel information "$H^{(k)}_{ii}=H_{ki} \times W_{ki}$" on the signal addressed to its own mobile station and equivalent channel information "$H^{(k)}_{ij}=H_{kj} \times W_{cj}$" on the interference signal in Equation (1), the UEk calculates the weighting factor "$w_k$" of its own mobile station. Thereafter, when the UEk demodulates the data signal from the received signal, the UEk performs the demodulation by performing the weighting by using the weighting factor "$w_k$", thereby the UEk can demodulate the data signal in a state in which the interference signal is suppressed. In Equation (1), "$\sigma^2$" indicates the covariance matrix of the other cell interference received from the factor other than noise and a cooperation cell. In this example, a description has been given of a case of using the MMSE method; however, the method is not limited thereto. Various demodulation methods may also be used.

$$w_k = \tilde{H}_{ii}^{(k)H}(\tilde{H}_{ii}^{(k)H} + \tilde{H}_{ij}^{(k)}\tilde{H}_{ij}^{(k)H} + \text{diag}(\sigma^2))^{-1} \quad (1)$$

A description will be given here by referring back to FIG. 3. The decoding unit 36 is a processing unit that decodes, by using the control information notified by a separate control channel, the data signal that is demodulated by the demodulating unit 35. The acquired decoded reception data is stored in, for example, a reception buffer (not illustrated) and is subjected to a process by an application processing unit (not illustrated). Furthermore, the acquired decoded control information is output to the control information processing unit 37. The acquired decoded control information includes therein RRC control information, MAC-Control Element (CE) control information, notification information, and paging information.

Furthermore, the reception quality may also be acquired from the reference signal that is acquired by the decoding unit 36. The reception quality includes therein, for example, the signal to interference ratio (SIR) and the Signal to interference and noise ratio (SINR). Furthermore, the reception quality includes therein Reference Signal Received Power (RSRP) and Reference Signal Received Power (RSRQ, i.e., received power value/total sum of electrical power value).

The control information processing unit 37 is a processing unit that performs a process on the received control information and that outputs the control information to the control channel demodulating unit 34 or the transmission power control unit 44. For example, the control information processing unit 37 outputs the RNTI information to the control channel demodulating unit 34. Furthermore, the control information processing unit 37 outputs the transmission power control parameter to the transmission power control unit 44.

The data processing unit 38 is a processing unit that creates a data signal from transmission data. For example, the transmission data is subjected to a process by an application processing unit (not illustrated) and is stored in a buffer (not illustrated transmission). The data processing unit 38 reads the data on an application or the like stored in a transmission buffer, creates a data signal, and outputs the created data signal to the multiplexing unit 39.

The multiplexing unit 39 is a processing unit that multiplexes the data signal input from the data processing unit 38 into the control signal created from the control information, such as an RRC or a MAC-CE. Then, the multiplexing unit 39 outputs the multiplexed signal to the symbol mapping unit 40. The multiplexing method used by the multiplexing unit 39 may be an arbitrary multiplexing method, such as Single Carrier-Frequency Division Multiple Access (SC-FDMA).

The symbol mapping unit 40 is a processing unit that maps the signal that is input from the multiplexing unit 39 targeted for transmission into the time axis direction. Then, the symbol mapping unit 40 outputs the mapped signal to the multiplexing unit 41.

The multiplexing unit 41 is a processing unit that multiplexes a pilot signal that is the reference signal into the signal that has been subjected to symbol mapping by the symbol mapping unit 40. Then, the multiplexing unit 41 outputs the multiplexed signal to the FFT unit 42. The multiplexing method used by the multiplexing unit 41 may be an arbitrary multiplexing method.

The FFT unit 42 is a processing unit that performs an FFT process on the signal multiplexed by the multiplexing unit 41 and that outputs the signal to the frequency mapping unit 43. The frequency mapping unit 43 is a processing unit that maps the signal subjected to the FFT process by the FFT unit 42 in the frequency direction and that outputs the signal to the IFFT unit 45.

The IFFT unit 45 is a processing unit that performs the signal subjected to the frequency mapping by the frequency mapping unit 43 on an IFFT process and that creates a transmission signal. The wireless processing unit 46 is a processing unit that performs the signal subjected to the IFFT process by the IFFT unit 45 on a D/A conversion process or the like and that outputs the signal to the antenna 31.

Furthermore, although a description has been omitted, a cyclic prefix (CP) may also be attached to the OFDM signal. In such a case, the CP is removed at an input step at the FFT unit 33 and a CP is attached at an output step at the IFFT unit 45.

[Flow of a process] In the following, the flow of a process performed in the wireless communication system illustrated in FIG. 1 will be described. In this example, the sequence of the process performed by the wireless communication system will be described with reference to FIG. 6 and the flow of the process performed by a mobile station will be described with reference to FIG. 7.

(Sequence)

Figure 6:
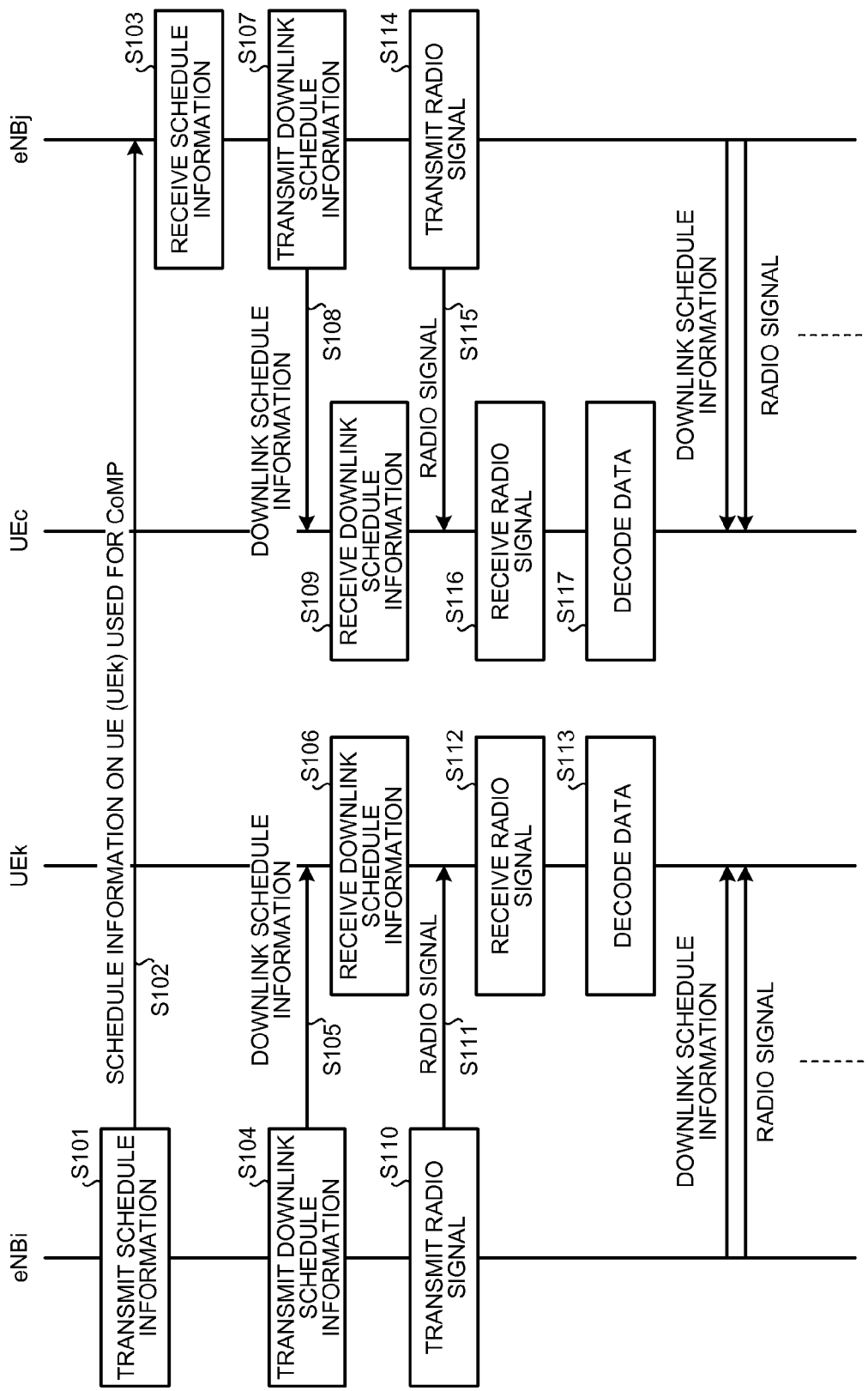
FIG. 6 is a sequence diagram of a process performed in the wireless communication system.

FIG. 6 is a sequence diagram of a process performed in the wireless communication system. In this case, it is assumed that the total number of the antenna port numbers to be used among the eNBi, the UEk, the eNBj, and the UEc is previously defined.

For example, if the total number of the antenna ports that are used in the wireless communication system is six and the number of the antenna ports used by the eNBi is two, the number of antenna ports used by the eNBj is four. Furthermore, because the number of antenna ports allocated to the UEk is two, the UEk can specify that four antenna ports are allocated to the UEc that is targeted for CoMP transmission. If the total number of the antenna port numbers to be used is not previously defined, the number of antenna ports to be used may also be previously sent and received.

As illustrated in FIG. 6, the eNBi transmits schedule information to the adjacent eNBj (Step S101). The schedule information transmitted at this point is the schedule information that is related to the UEk used for CoMP and that includes therein the radio resource information and the antenna port number allocated to the UEk.

Then, the eNBj receives the schedule information transmitted by the eNBi (Step S102). The eNBj can specify, from the schedule information, the radio resource that performs the CoMP transmission and the antenna port number that is allocated to the UEk by the eNBi for the CoMP transmission. Then, the eNBj refers to the association table illustrated in FIG. 4 or FIG. 5, specifies the antenna port number associated with the antenna port number that is allocated by the eNBi, and determines that the specified antenna port number is used.

Then, the eNBi transmits downlink schedule information to the UEk (Steps S104 and S105) and the UEk receives the schedule information transmitted by the eNBi (Step S106). The schedule information that is transmitted at this point includes therein the antenna port number that is allocated to the UEk.

Similarly, the eNBj transmits downlink schedule information to the UEc (Steps S107 and S108) and the UEc receives the schedule information transmitted by the eNBj (Step S109). The schedule information transmitted at this point includes therein the antenna port number that is specified from the schedule information received at Step S103 and that is allocated to the UEc.

Then, by using the radio resource that is sent to the eNBj as a notification at Step S101, the eNBi transmits a radio signal to the UEk (Steps S110 and S111) and the UEk receives a radio signal transmitted by the eNBi (Step S112). Subsequently, the UEk decodes the data signal addressed to its own mobile station from the received radio signal (Step S113).

For example, the UEk refers to the association table illustrated in FIG. 4 or 5 and specifies an antenna port number that is associated with the antenna port number that is notified at Step S106 as the antenna port number that is used by the eNBj. Then, the UEk specifies, from the specified antenna port number, the location of the dedicated pilot signal of the UEc and specifies the location of the dedicated pilot signal of its own mobile station from the antenna port number that is notified at Step S105. Subsequently, the UEk estimates, by using the dedicated pilot signal of the UEc, a channel of the radio signal that has been transmitted by the eNBj to the UEc and that is included when the UEk receives the radio signal from the eNBi. Then, the UEk decodes, from the received radio signal by using the dedicated pilot signal of the UEk, the data signal addressed to its own mobile station. At this point, the UEk suppresses the interference signal by using the estimated channel estimate value obtained from the eNBj.

Similarly, the eNBj transmits a radio signal to the UEc by using the radio resource that is notified by the eNBi at Step S103 (Steps S114 and S115) and the UEc receives the radio signal transmitted by the eNBj (Step S116). Then, the UEc decodes, from the received radio signal, the data signal addressed to its own mobile station (Step S117).

For example, the UEc refers to the association table illustrated in FIG. 4 or 5 and specifies, as the antenna port number that is used by the eNBi, the antenna port number that is notified at Step S103. Then, the UEc specifies the location of the dedicated pilot signal of the UEk from the specified antenna port number and specifies the location of the dedicated pilot signal of its own mobile station from the antenna port number that is notified at Step S107. Subsequently, the UEc estimates, by using the dedicated pilot signal of the UEk, a channel that is used for the radio signal transmitted by the eNBi to the UEk and that is included when the radio signal is received from the eNBj. Then, by using the dedicated pilot signal of its own mobile station, the UEc decodes, from the received radio signal, the data signal that is addressed to its own mobile station. At this point, the UEc suppresses the interference signal by using the estimated channel estimate value obtained from the eNBi.

Then, if downlink data transmission is performed from the base station to the mobile station, processes at Steps S101 to S117 are performed.

(Process at the Mobile Station)

Figure 7:
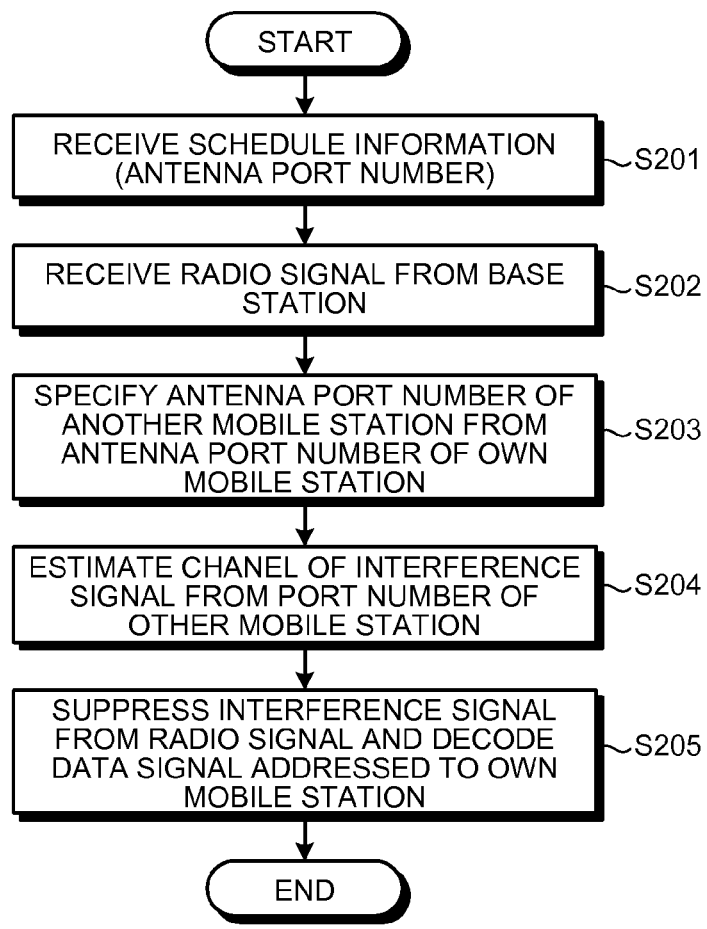
FIG. 7 is a flowchart illustrating the flow of a process performed by the mobile station in the wireless communication system.

FIG. 7 is a flowchart illustrating the flow of a process performed by the mobile station in the wireless communication system. In this example, a description will be given of the UEk as an example.

As illustrated in FIG. 7, the UEk receives downlink schedule information from the eNBi to which the UEk is connected (Step S201). The schedule information includes therein the antenna port number that is allocated to its own mobile station. Furthermore, it is assumed that the UEk recognizes that the maximum number of antenna ports that are used for CoMP communication in the wireless communication system. Namely, if two antenna port numbers are notified at Step S201 when the maximum of antenna ports is six, the UEk can specify that four antenna port numbers are allocated to the other mobile station.

Subsequently, the UEk receives a radio signal from the eNBi that is the base station to which its own mobile station is connected (Step S202). Then, the UEk refers to the association table illustrated in FIG. 4 or 5 and specifies an antenna port number that is associated with the antenna port number of its own mobile station received at Step S201 and that is allocated to the other mobile station (Step S203).

Then, the UEk specifies the location of the dedicated pilot signal of the other mobile station that is specified at Step S203 from the antenna port number allocated to the other mobile station and estimates, by using the specified dedicated pilot signal of the other mobile station, a channel used for an interference signal (Step S204).

Then, when the UEk decodes the data signal from the radio signal by using the dedicated pilot signal that is specified from the antenna port number of its own mobile station received at Step S201, the UEk suppresses the interference signal by using the channel estimate value of the interference signal and decodes the signal (Step S205).

[Advantage]

As described above, according to the first embodiment, the mobile station holds the association table of the antenna port numbers that are allocated to mobile stations by each of the base stations that perform CoMP transmission. Consequently, even if the plurality of the base stations transmit data to different mobile stations by using the same radio resource, each of the mobile stations can specify the antenna port number of the other mobile station. Accordingly, each of the mobile stations can estimate a channel for an interference signal. Consequently, each of the mobile stations can suppress an interference signal when the mobile station decodes a data signal. Accordingly, each of the mobile stations can suppress the degradation of the communication quality of the received data signal. Furthermore, because the antenna port number that is allocated to the other mobile station is not sent to each of the mobile stations as a notification, it is possible to reduce the overhead of the control information.

Second Embodiment

In the first embodiment, an example of performing CoMP transmission has been described; however, transmission is not limited thereto. The process may also be similarly performed even if multi-user MIMO transmission is used. Accordingly, in a second embodiment, an example of multi-user MIMO transmission will be described. The functional configuration of each device according to the second embodiment is the same as that in the first embodiment; therefore, a description thereof in detail will be omitted.

[Overall Configuration]

Figure 8:
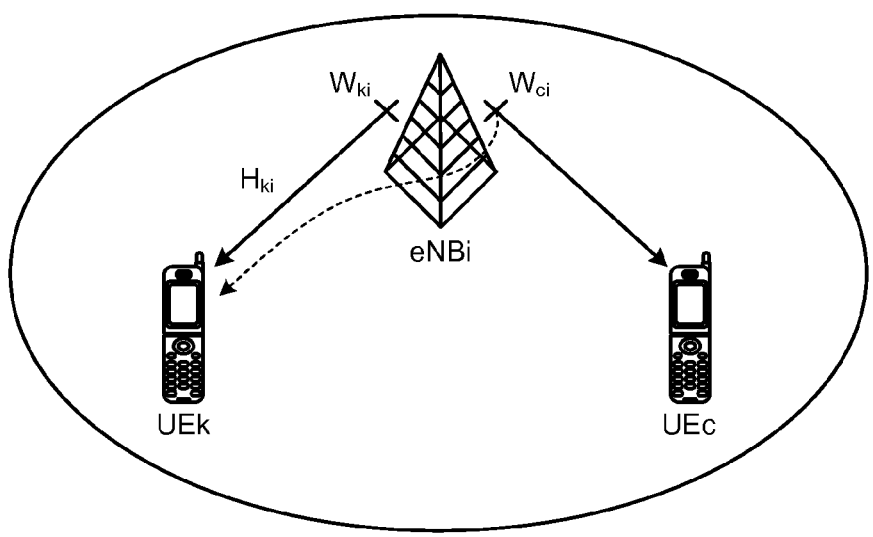
FIG. 8 is a schematic diagram illustrating an example of the overall configuration of a wireless communication system according to a second embodiment.

FIG. 8 is a schematic diagram illustrating an example of the overall configuration of a wireless communication system according to a second embodiment. The wireless communication system illustrated in FIG. 8 is a system in which the base station (eNBi) multiplexes, by using multi-user MIMO transmission, a data signal addressed to the mobile station (UEk) and a data signal addressed to the mobile station (UEc) into the same radio resource. In this wireless communication system, base stations and mobile stations performs wireless communication used in LTE. In this example, a description will be given with the assumption that an eNBi multiplexes two mobile stations in each cell into the same radio resource and transmits a data signal. Namely, downlink multi-user MIMO communication will be described as an example.

For example, when the eNBi performs MIMO transmission on two UEs that are located in a cell, the multiplexing unit 24 illustrated in FIG. 2 multiplexes two pieces of transmission data each of which has been subjected to precoding for each UE into the same radio resource. Furthermore, in this example, a description will be given of the UEk as an example; however, the same process may also be performed on the UEc.

The eNBi multiplexes a data signal addressed to the UEk and a data signal addressed to the UEc into the radio resource A and then transmits the signals. The UEk connects to the cell i, in which the radio wave of the eNBi reaches, and receives the data signal from the eNBi. Similarly, the UEc connects to the cell i, in which the radio wave of the eNBi reaches, and receives the data signal from the eNBi.

In such a case, because the UEk receives a multiplexed data signal from the eNBi, data addressed to the other mobile station is included in the received radio signal and thus the quality of the data signal addressed to its own mobile station is low. Accordingly, if the UEk can specify a dedicated pilot signal that is allocated to the UEc, the UEk can estimate equivalent channel information on the interference signal.

In a description below, the precoding vector used for a transmission signal that is addressed to the UEk in the cell i is represented by "$W_{ki}$" and the channel matrix between the cell j and the UEk is represented by "$H_{kj}$". In this case, if the UEk can specify a dedicated pilot signal allocated to the UEc, the UEk can estimate equivalent channel information "$H^{(k)}_{ic}=H_{kj}\times W_{cj}$" on the interference signal from the UEc that performs communication by using the same radio resource in the cell j.

Then, by substituting the equivalent channel information "$H^{(k)}_{ii}=H_{ki}\times W_{ki}$" on the signal addressed to its own mobile station and equivalent channel information "$H^{(k)}_{ic}=H_{ki}\times W_{ci}$" on the interference signal in Equation (2), the UEk calculates the weighting factor "$w_k$" of the signal addressed its own mobile station. Then, when the UEk decodes a data signal from the received signal, the UEk performs the decoding by performing the weighting using the weighting factor "$w_k$", thereby the UEk can decode the data signal in a state in which the interference signal is suppressed. In Equation (2), "$\sigma^2$" indicates the covariance matrix of the other cell interference received from the factor other than noise and a cooperation cell. In this example, similarly to the first embodiment, a description has been given of a case of using the MMSE method; however, the method is not limited thereto. Various decoding method may also be used.

$$w_k = \tilde{H}_{ii}^{(k)H}(\tilde{H}_{ii}^{(k)}\tilde{H}_{ii}^{(k)H}+\tilde{H}_{ic}^{(k)}\tilde{H}_{ic}^{(k)H}+\text{diag}(\sigma^2))^{-1} \quad (2)$$

Specifically, the UEk holds an association table that stores therein combinations of antenna port numbers each of which is to be allocated by an eNBi to each UE. Then, the UEk receives its own antenna port number that is allocated by the eNBj to its own mobile station, i.e., the UEk. Subsequently, the UEk refers to the association table and specifies the antenna port number that is associated with the received its own antenna port number as the antenna port number that is related to the other mobile station and that is allocated by the UEc.

Consequently, the UEk can specify its own dedicated pilot signal from its own antenna port number and can specify the dedicated pilot signal of the UEc from the antenna port number of the other mobile station. Accordingly, the UEk can calculate equivalent channel information "$H^{(k)}_{ii}=H_{ki}\times W_{ki}$" on the signal addressed to its own mobile station and the equivalent channel information "$H^{(k)}_{ic}=H_{ki}\times W_{ci}$" on the interference signal. Then, by substituting these values in Equation (2), the UEk calculates the weighting factor "$w_k$". Then, the UEk performs the decoding by performing the weighting by using the weighting factor "$w_k$", thereby the UEk can suppress the interference signal and decode the data signal.

[Flow of a Process]

In the following, a description will be given of the flow of a process performed in the wireless communication system according to the second embodiment illustrated in FIG. 8. Here, the sequence of the process performed in the wireless communication system will be described. The process performed by the mobile station is the same as that in the first embodiment; therefore, the description thereof in detail will be omitted.

Figure 9:
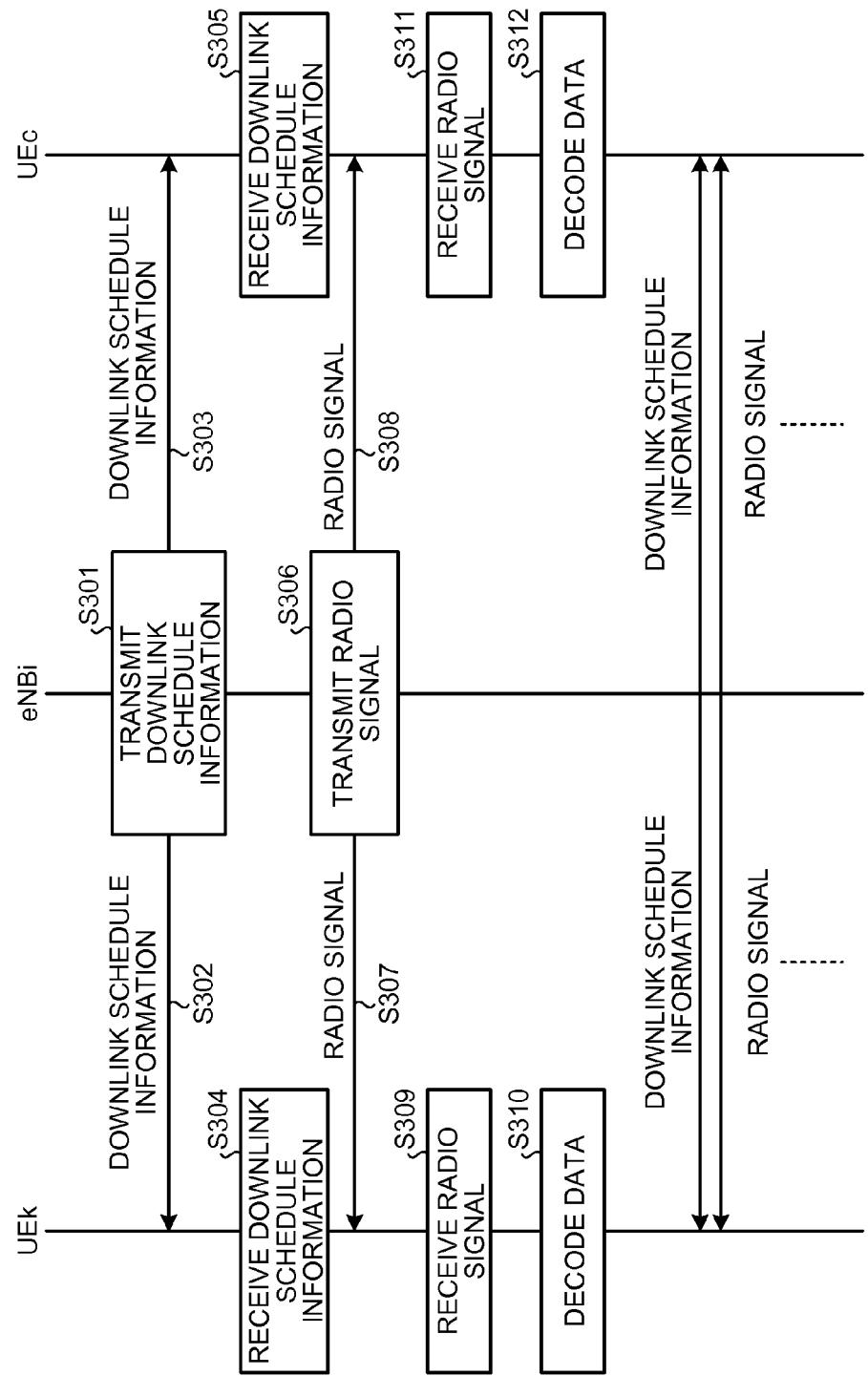
FIG. 9 is a sequence diagram of a process performed in the wireless communication system in the second embodiment.

FIG. 9 is a sequence diagram of a process performed in the wireless communication system in the second embodiment. In this case, it is assumed that the total number of antenna port numbers to be used among the eNBi, the UEk, and the UEc is previously defined.

As illustrated in FIG. 9, the eNBi transmits schedule information to each of the UEk and the UEc that are located in the cell (Steps S301 to S303). At this point, the schedule information transmitted to the UEk is the schedule information that is related to the UEk used for multi-user MIMO transmission and that includes therein information on the radio resource allocated to the UEk radio resource and the antenna port number allocated to the UEk. Similarly, the schedule information transmitted to the UEc is schedule information that is related to the UEc used for the multi-user MIMO transmission and that includes therein information on the radio resource allocated to the UEc and the antenna port number allocated to the UEc.

Subsequently, the UEk receives schedule information transmitted by the eNBi (Step S304). The UEk can specify, from this schedule information, the radio resource that is used to perform the multi-user MIMO transmission and the antenna port number that is allocated to the UEk for the multi-user MIMO transmission. Then, the UEk refers to the association table illustrated in FIG. 4 or 5 and specifies the antenna port number of the UEc that is associated with the antenna port number that is used by its own mobile station, i.e., the UEk.

Similarly, the UEc receives schedule information transmitted by the eNBi (Step S305). The UEc can specify, from this schedule information, the radio resource that is used to perform the multi-user MIMO transmission the antenna port number allocated to the UEc used for the multi-user MIMO transmission. Then, the UEc refers to the association table illustrated in FIG. 4 or 5 and specifies the antenna port number of the UEk that is associated with the antenna port number used by its own mobile station, i.e., the UEc.

Then, by using the radio resources notified at Step S301, the eNBi multiplexes data to be sent to each of the mobile stations and transmits the multiplexed data to the UEk and the UEc (Steps S306 to S308). The UEk receives the radio signal transmitted by the eNBi (Step S309). Subsequently, the UEk decodes the data signal addressed to its own mobile station from the received radio signal (Step S310). At this point, the UEk calculates a channel estimate value by using the dedicated pilot signal that is specified from the antenna port number of the UEc, suppresses an interference signal by using the channel estimate value, and decodes the data signal.

Similarly, the UEc receives the radio signal transmitted by the eNBi (Step S311). Subsequently, the UEc decodes the data signal addressed to its own mobile station from the received radio signal (Step S312). At this point, the UEc calculates a channel estimate value by using the dedicated pilot signal that is specified from the antenna port number of the UEk, suppresses the interference signal by using the channel estimate value, and decodes the data signal. Thereafter, if the multi-user MIMO transmission is performed, the process at Step S301 and the subsequent processes are repeated.

[Advantage]

As described above, according to the second embodiment, the mobile station holds an association table of antenna port numbers that are allocated to mobile stations by the base station that performs the multi-user MIMO transmission. Consequently, even if the base station transmits data multiplexed into a different mobile station by using the same radio resource, each of the mobile stations can specify the antenna port number of the other mobile station. Accordingly, each of the mobile stations can estimate a channel of an interference signal. Consequently, each of the mobile stations can suppress the interference signal when each of the mobile stations decodes a data signal. Accordingly, each of the mobile stations can suppress degradation of the communication quality of the received data signal.

Third Embodiment

In the first embodiment, a description has been given of an example in which, when CoMP transmission is performed, the UE targeted for CoMP holds the association table of the antenna port numbers; however, the embodiment is not limited thereto. For example, the base station may also notify each UE of the antenna port number that is allocated to the UE targeted for the CoMP. The overall configuration and the functional configuration of each device in a wireless communication system according to a third embodiment are the same as those in the first embodiment; therefore, descriptions thereof in detail will be omitted. Here, the flow of a process performed in the wireless communication system according to the third embodiment will be described and then the flow of the process performed by a mobile station will be described.

(Sequence)

Figure 10:
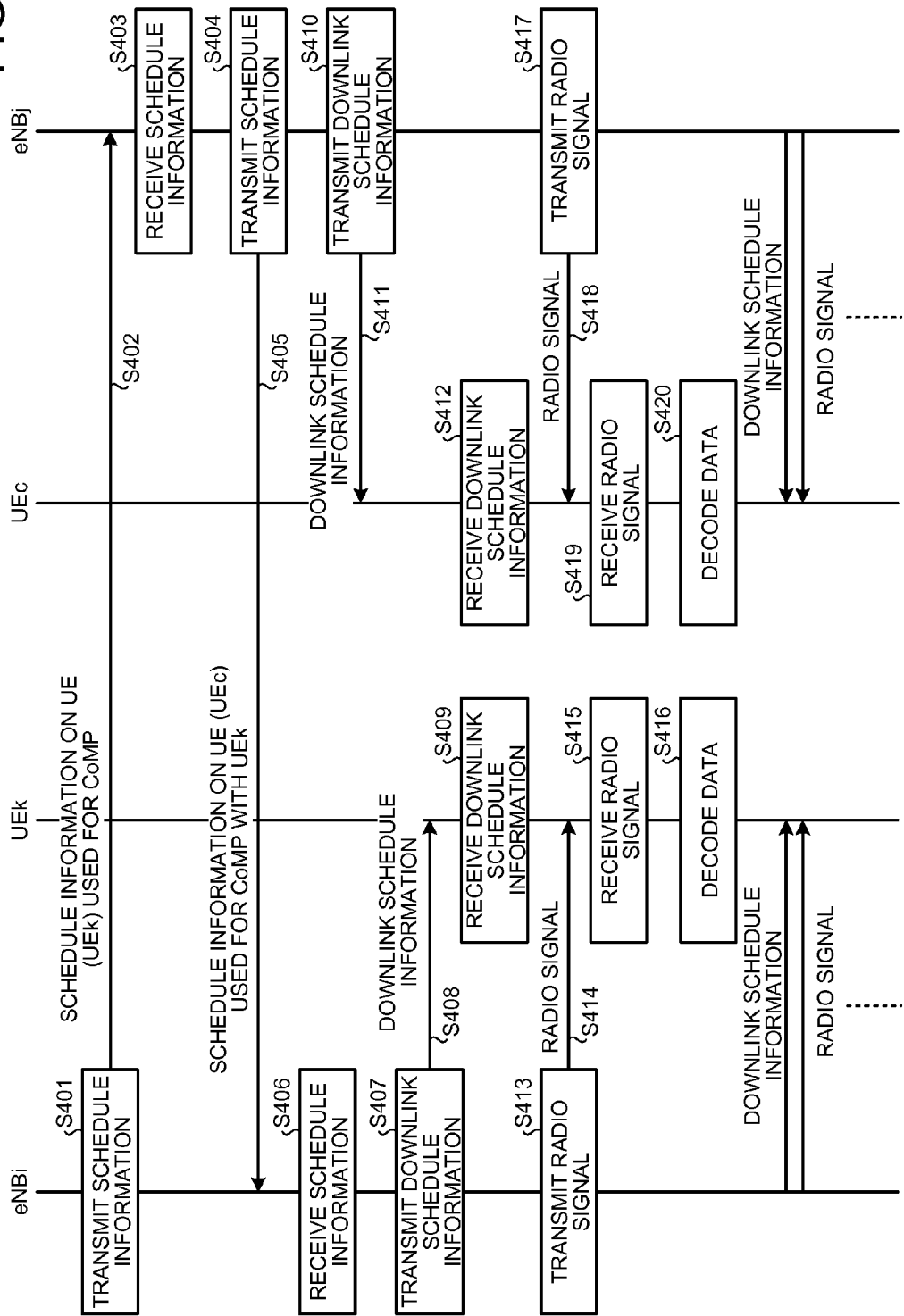
FIG. 10 is a sequence diagram of a process performed in a wireless communication system according to a third embodiment.

FIG. 10 is a sequence diagram of a process performed in a wireless communication system according to a third embodiment. As illustrated in FIG. 10, the eNBi transmits schedule information to the adjacent eNBj (Steps S401 and S402). The schedule information transmitted at this point is the schedule information that is related to the UEk used for CoMP and that includes therein the radio resource information and the antenna port number allocated to the UEk.

Subsequently, the eNBj receives the schedule information transmitted by the eNBi (Step S403). The eNBj can specify, from this schedule information, the radio resource that is used to perform the CoMP transmission and the antenna port number allocated by the eNBi to the UEk for the CoMP transmission.

Then, the eNBj transmits the schedule information to the adjacent eNBi (Steps S404 and S405). The schedule information transmitted at this point is the schedule information that is related to the UEc used for CoMP and that includes therein the radio resource information and the antenna port number allocated to the UEc.

Subsequently, the eNBi receives the schedule information transmitted by the eNBj (Step S406). The eNBi can specify, from this schedule information, the antenna port number that is allocated by the eNBj to the UEc for the CoMP transmission.

Then, the eNBi transmits downlink schedule information to the UEk (Steps S407 and S408) and the UEk receives the schedule information transmitted by the eNBi (Step S409). The schedule information transmitted at this point includes therein the antenna port number that is allocated to the UEk and the antenna port number that is allocated to the UEc.

Similarly, the eNBj transmits downlink schedule information to the UEc (Steps S410 and S411) and the UEc receives the schedule information transmitted by the eNBj (Step S412). The schedule information transmitted at this point includes therein the antenna port number that is allocated to the UEk and the antenna port number that is allocated to the UEc.

Then, by using the radio resource sent to the eNBj as a notification at Step S401, the eNBi transmits a radio signal to the UEk (Steps S413 and S414) and the UEk receives the radio signal transmitted by the eNBi (Step S415). Subsequently, the UEk decodes, from the received radio signal, the data signal addressed to its own mobile station (Step S416).

Namely, the UEk decodes, from the received radio signal, the data signal by using the dedicated pilot signal specified from the antenna port number that is allocated to its own mobile station, i.e., the UEk, and that is received at Step S409. At this point, the UEk specifies the dedicated pilot signal from the antenna port number that is allocated to the UEc received at Step S409. Then, the UEk estimates the channel for the radio signal that is transmitted by the eNBj to the UEc and that is included when the UEk receives from the eNBi. Then, when the UEk decodes, from the received radio signal, the data signal addressed to the UEk, the UEk suppresses an interference signal by using the channel estimate value of the estimated channel from the eNBj.

Similarly, by using the radio resource received from the eNBi as a notification at Step S401, the eNBj transmits a radio signal to the UEc (Steps S417 and S418) and the UEc receives the radio signal transmitted by the eNBj (Step S419). Subsequently, the UEc decodes, from the received radio signal, the data signal addressed to the UEc (Step S420).

Namely, by using the dedicated pilot signal that is specified from the antenna port number that is allocated to the UEc and that is received at Step S412, the UEc decodes the data signal from the received radio signal. At this point, the UEc specifies the dedicated pilot signal from the antenna port number that is allocated to the UEk and that is received at Step S412. Then, the UEc estimates a channel for the radio signal that is transmitted by the eNBi to the UEk and that is included when the UEc receives from the eNBj. Then, when the UEc decodes, from the received radio signal, the data signal addressed to the UEc, the UEc suppresses an interference signal by using the channel estimate value of the estimated channel from the eNBi.

Thereafter, if there is no change in the antenna port number transmitted and received at Steps S401 to S406, the processes at Steps S407 to S420 are repeated. Furthermore, if there is any change in the antenna port number transmitted and received at Steps S401 to S406, a process at Step S401 and the subsequent processes are performed.

(Process Performed by the Mobile Station)

Figure 11:
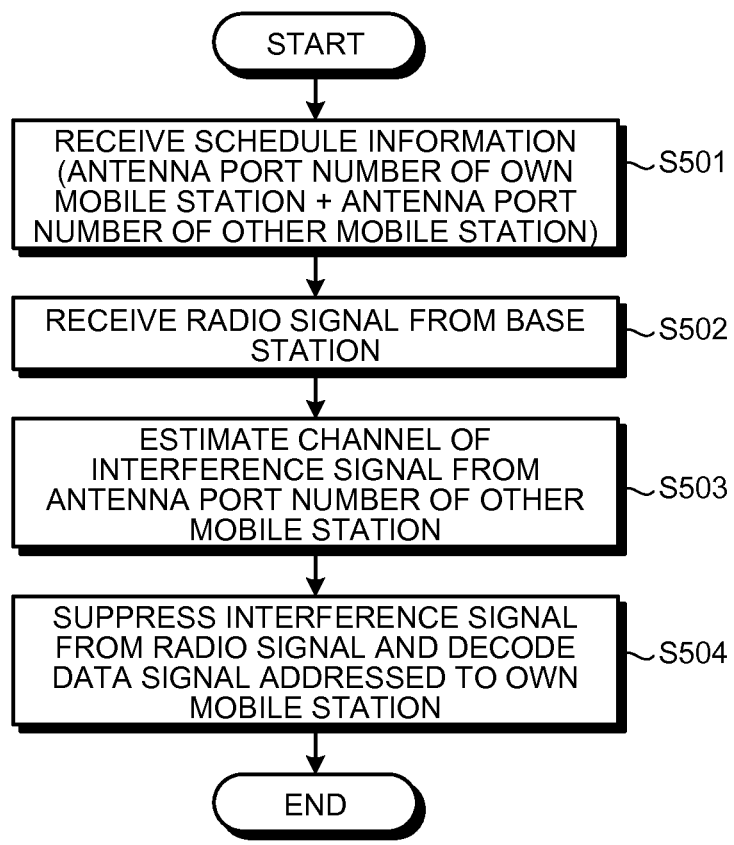
FIG. 11 is a flowchart illustrating the flow of a process performed by a mobile station in the wireless communication system according to the third embodiment.

FIG. 11 is a flowchart illustrating the flow of a process performed by a mobile station in the wireless communication system according to the third embodiment. In the following, a description will be given of the UEk as an example.

As illustrated in FIG. 11, the UEk receives downlink schedule information from the eNBi to which its own mobile station, i.e., the UEk, is connected (Step S501). The schedule information includes therein the antenna port number that is allocated to, its own mobile station and the antenna port number that is allocated to the UEc that is used, as the target, for the CoMP.

Subsequently, the UEk receives a radio signal from the eNBi that is the base station to which its own mobile station is connected (Step S502). Then, from the antenna port number that is allocated to the UEc, which is the other mobile station, and that is received at Step S501, the UEk specifies the location of the dedicated pilot signal of the other mobile station and then estimates a channel of an interference signal by using the specified dedicated pilot signal of the other mobile station (Step S503).

Then, when the UEk decodes a data signal from the radio signal by using the dedicated pilot signal that is specified from its own antenna port number received at Step S501, the UEk suppresses an interference signal by using the channel estimate value of the interference signal and then decodes the data signal (Step S504).

[Advantage]

As described above, according to the third embodiment, even if a mobile station does not hold the association table of the antenna port numbers, similarly to the first embodiment, the mobile station can estimate a channel of an interference signal. Consequently, when the mobile station decodes the data signal from the received signal, the mobile station can suppress the interference signal and suppress degradation of the communication quality of the data signal. Furthermore, because the mobile station does not hold the association table, it is possible to reduce the memory capacity and thus further reduce the size.

Fourth Embodiment

In the second embodiment, a description has been given of an example in which, when the multi-user MIMO transmission is performed, the UE holds the association table of the antenna port numbers; however, the embodiment is not limited thereto. For example, the base station may also notify each UE of an antenna port number that is allocated to the UE that is targeted for the multi-user MIMO transmission. The overall configuration of a wireless communication system according to a fourth embodiment and the functional configuration of each device are the same as those in the second embodiment; therefore, descriptions thereof in detail will be omitted. Here, the flow of a process performed in the wireless communication system according to the fourth embodiment will be described. Furthermore, the process performed by the mobile station is the same as that in the third embodiment; therefore, a description thereof in detail will be omitted.

Figure 12:
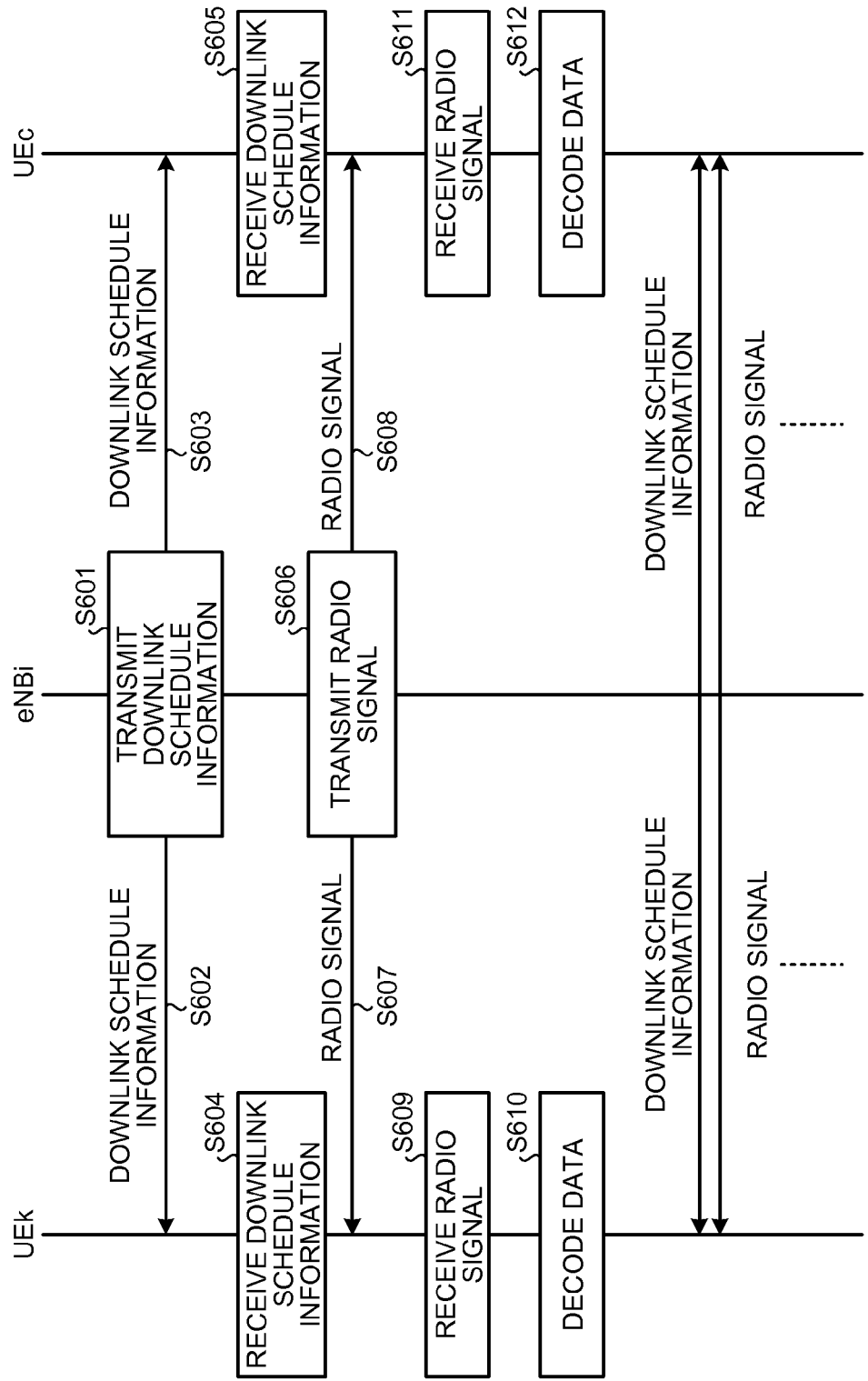
FIG. 12 is a sequence diagram of a process performed in the wireless communication system according to the third embodiment.

FIG. 12 is a sequence diagram of a process performed in the wireless communication system according to the third embodiment. As illustrated in FIG. 12, the eNBi transmits schedule information to each of the UEk and the UEc located in a cell (Steps S601 to S603).

Here, the schedule information transmitted to the UEk and the UKc is the schedule information on the UEk and the UKc that are used for the multi-user MIMO transmission. The schedule information includes therein the information on the radio resource that is allocated to each of the UEk and the UEc, the antenna port number that is allocated to the UEk, and the antenna port number that is allocated to the UEc.

Subsequently, the UEk receives the schedule information that has been transmitted by the eNBi (Step S604). The UEk can specify, from this schedule information, the radio resource that is used to perform the multi-user MIMO transmission, the antenna port number allocated to the UEk that is used for the multi-user MIMO transmission, and the antenna port number allocated to the UEc.

Similarly, the UEc receives the schedule information transmitted by the eNBi (Step S605). The UEc can specify, from this schedule information, the radio resource that is used to perform the multi-user MIMO transmission, the antenna port number allocated to the UEk for the multi-user MIMO transmission, and the antenna port number allocated to the UEc.

Then, the eNBi multiplexes the data addressed to each mobile station by using the radio resource notified at Step S601 and then transmits the data to the UEk and the UEc (Steps S606 to S608). The UEk receives the radio signal that has been transmitted by the eNBi (Step S609). Subsequently, the UEk decodes, from the received radio signal, the data signal addressed to its own mobile station (Step S610). At this point, the UEk calculates a channel estimate value by using a dedicated pilot signal that is specified from the antenna port number of the UEc, suppresses an interference signal by using the channel estimate value, and decodes the data signal.

Similarly, the UEc receives the radio signal that has been transmitted by the eNBi (Step S611). Then, the UEc decodes, from the received radio signal, the data signal addressed to its own mobile station (Step S612). At this point, the UEc calculates a channel estimate value by using the dedicated pilot signal that is specified from the antenna port number of the UEk, suppresses an interference signal by using the channel estimate value, and decodes the data signal. Thereafter, when the multi-user MIMO transmission is performed, the process at Step S601 and the subsequent processes are repeated.

[Advantage]

As described above, according to the fourth embodiment, even if a mobile station does not hold the association table of the antenna port numbers, similarly to the second embodiment, the mobile station can estimate a channel for an interference signal. Consequently, when the mobile station decodes the data signal from the received signal, the mobile station can suppress an interference signal and thus can suppress degradation of the communication quality of the data signal. Furthermore, because the mobile station does not hold the association table, it is possible to reduce the memory capacity and thus further reduce the size.

Fifth Embodiment

In the above explanation, a description has been given of the embodiments of the device according to the present invention; however, the present invention can be implemented with various kinds of embodiments other than the embodiments described above. Therefore, another embodiment included in the present invention will be described below.

(Dedicated Pilot Signal)

In the embodiments described above, a description has been given of an example in which each UE specifies a dedicated pilot signal by using an antenna port number; however, the embodiment is not limited thereto. For example, in the embodiments described above, a dedicated pilot signal itself may be used. Any kind of information may be used for the process as long as the information that can be used to specify a dedicated pilot signal.

(Recommended PMI)

For example, with the multi-user MIMO transmission or the like described in the second embodiment or the fourth embodiment, when recommended PMI information from the UEk is fed back to the eNBi, it is possible to determine a feedback PMI by using, for example, Equation (3). Specifically, a feedback PMI can be determined by the product of "the function that returns an index of an entry vector that is closest to the vector x in a code book" and "the eigenvector that is associated with the maximum eigenvalue in the matrix M: Eig (M)".

$$PMI_k = \arg Q(\text{Eig}(w_k \tilde{H}_{ki})) \quad (3)$$

(System)

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

(Hardware Configuration of the Base Station)

Figure 13:
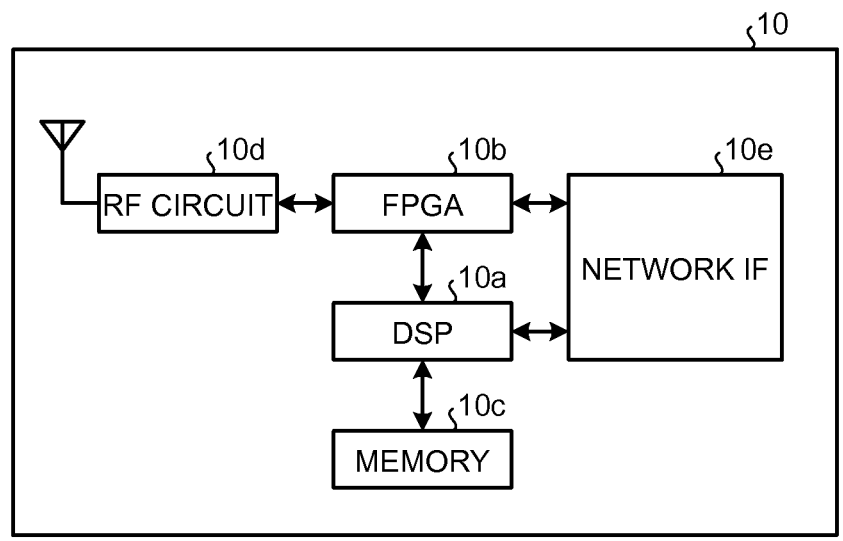
FIG. 13 is a schematic diagram illustrating the hardware configuration of the base station.

FIG. 13 is a schematic diagram illustrating the hardware configuration of the base station. As illustrated in FIG. 13, the base station 10 includes, as hardware components, a digital signal processor (DSP) 10a and a field programmable gate array (FPGA) 10b. Furthermore, the base station 10 includes a memory 10c, a radio frequency (RF) circuit 10d, and a network interface (IF) 10e.

The DSP 10a and the FPGA 10b are connected via the network IF 10e, such as a switch or the like, such that various signals or data can be input and output. The RF circuit 10d includes an antenna. The memory 10c is formed by, for example, a RAM, such as a synchronous dynamic random access memory (SDRAM), or the like; a read only memory (ROM); or a flash memory. The various control units illustrated in FIG. 2 can be implemented by, for example, the DSP 10a, the FPGA 10b, or the like. The wireless processing unit or the like illustrated in FIG. 2 can be implemented by the RF circuit 10d.

(Hardware Configuration of a Mobile Station)

Figure 14:
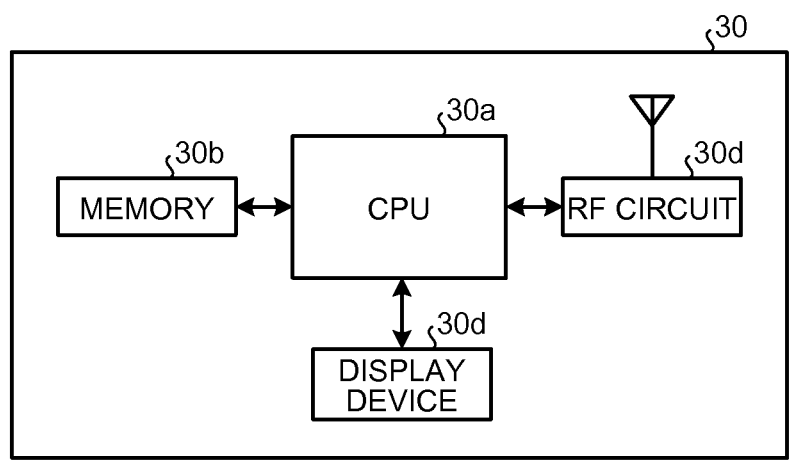
FIG. 14 is a schematic diagram illustrating the hardware configuration of a terminal.

FIG. 14 is a schematic diagram illustrating the hardware configuration of a terminal. As illustrated in FIG. 14, the mobile station 30 includes a central processing unit (CPU) 30a, a memory 30b, an RF circuit 30c that includes an antenna, and a display device 30d, such as a liquid crystal display (LCD) or the like. The memory 30b is formed by, for example, a RAM, such as an SDRAM, a ROM, and a flash memory. The wireless processing unit illustrated in FIG. 3 is implemented by the RF circuit 30c. Furthermore, the various control unit illustrated in FIG. 3 is implemented by, for example, the CPU 30a or the like.

According to an aspect of the embodiment of a mobile station and a wireless communication method disclosed in the present invention, an advantage is provided in that degradation of the communication quality can be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile station comprising:
   a memory; and
   a processor that is connected to the memory, wherein the processor executes a process comprising:
   when one or a plurality of base stations transmit a signal addressed to a plurality of mobile stations by using a same radio resource, referring to an association table in which an allocation antenna port number and an interference antenna port number are associated and which is previously defined between the plurality of base stations;
   specifying the interference antenna port number which is allocated to a coordinated mobile station which uses the same radio resource as the mobile station and which is associated with the allocation antenna port number being allocated to the mobile station in the association table;
   acquiring a first dedicated pilot signal allocated to the mobile station using the allocation antenna port number and a second dedicated pilot signal that is allocated to the coordinated mobile station using the interference antenna port number;
   receiving a radio signal from the base station that is connected to the mobile station;
   estimating, by using the second dedicated pilot signal that is acquired at the acquiring, a channel through which a radio signal that is transmitted from the base station connected to the coordinated mobile station to the coordinated mobile station reaches the mobile station; and
   suppressing, when decoding a data signal addressed to the mobile station from the received radio signal by using the first dedicated pilot signal allocated to the mobile station, an interference signal in the radio signal by using an estimate value estimated at the estimating.

2. The mobile station according to claim 1, the process further comprising storing, in the memory, the association relationship of dedicated pilot signals that are allocated by the one or the plurality of base stations to each of the mobile stations, wherein
   the acquiring includes acquiring, from the memory, the second dedicated pilot signal that is allocated to the coordinated mobile station and that is associated with the first dedicated pilot signal allocated to the mobile station.

3. The mobile station according to claim 1, wherein the acquiring includes acquiring, from a first base station, the second dedicated pilot signal that is allocated by a second base station, which transmits a radio signal to the coordinated mobile station by using the same radio resource as that used for the first base station to which the mobile station is connected, to the coordinated mobile station that is connected to the second base station.

4. The mobile station according to claim 1, wherein
   the acquiring includes acquiring the maximum number of user data that use the same radio resource from the base station to which the mobile station is connected, and
   the estimating includes estimating, by using the second dedicated pilot signals that are allocated to the coordinated mobile station and the number of which corresponds to the number that is obtained by subtracting the number of first dedicated pilot signals allocated to the mobile station from the maximum number, the channel through which the radio signal that is transmitted from the base station connected to the coordinated mobile station reaches to the mobile station.

5. A wireless communication method comprising:
   executed by the mobile station,
   when one or a plurality of base stations transmit a signal addressed to a plurality of mobile stations by using a same radio resource, referring to an association table in which an allocation antenna port number and an interference antenna port number are associated and which is previously defined between the plurality of base stations;
   specifying the interference antenna port number which is allocated to a coordinated mobile station which uses the same radio resource as the mobile station and which is associated with the allocation antenna port number being allocated to the mobile station in the association table;

acquiring a first dedicated pilot signal allocated to the mobile station using the allocation antenna port number and a second dedicated pilot signal that is allocated to the coordinated mobile station using the interference antenna port number;

receiving, a radio signal from the base station that is connected to the mobile station;

estimating, performed by the mobile station by using the second dedicated pilot signal that is acquired at the acquiring, a channel through which a radio signal that is transmitted from the base station connected to the coordinated mobile station to the coordinated mobile station reaches the mobile station; and suppressing, when decoding a data signal addressed to the mobile station from the received radio signal by using the first dedicated pilot signal allocated to the mobile station, an interference signal in the radio signal by using an estimate value estimated at the estimating.

\* \* \* \* \*